(12) United States Patent
Gregor et al.

(10) Patent No.: US 12,090,896 B2
(45) Date of Patent: Sep. 17, 2024

(54) LONGITUDINAL ADJUSTMENT MECHANISM, VEHICLE SEAT

(71) Applicant: Keiper Seating Mechanisms Co., Ltd., Shanghai (CN)

(72) Inventors: Peter Gregor, Trencianske Stankovce (SK); Thorsten Schuermann, Odenthal (DE); Erik Sprenger, Wermelskirchen (DE); Juergen Stemmer, Remscheid (DE); Andrej Sulak, Podluzany (SK)

( * ) Notice: Subject to any disclaimer, the term of this patent is extended or adjusted under 35 U.S.C. 154(b) by 189 days.

(21) Appl. No.: 17/596,394

(22) PCT Filed: Jun. 10, 2020

(86) PCT No.: PCT/EP2020/066114
§ 371 (c)(1),
(2) Date: Dec. 9, 2021

(87) PCT Pub. No.: WO2020/249625
PCT Pub. Date: Dec. 17, 2020

(65) Prior Publication Data
US 2022/0161692 A1 May 26, 2022

(30) Foreign Application Priority Data

Jun. 14, 2019 (DE) .................. 10 2019 116 314.5
Aug. 22, 2019 (DE) .................. 10 2019 122 606.6
Sep. 19, 2019 (DE) .................. 10 2019 125 196.6

(51) Int. Cl.
*B60N 2/00* (2006.01)
*B60N 2/06* (2006.01)
*F16H 1/16* (2006.01)

(52) U.S. Cl.
CPC .............. *B60N 2/067* (2013.01); *F16H 1/16* (2013.01)

(58) Field of Classification Search
None
See application file for complete search history.

(56) References Cited

U.S. PATENT DOCUMENTS 5,273,242 A * 12/1993 Mouri .................... B60N 2/067
248/429
5,447,352 A * 9/1995 Ito ........................ B60N 2/0705
296/65.14
(Continued)

FOREIGN PATENT DOCUMENTS

DE 102005023095 A1 12/2005
DE 102006035437 A1 5/2007
(Continued)

OTHER PUBLICATIONS

European Patent Office, International Search Report and Written Opinion in Application No. PCT/EP2020/066114, dated Aug. 25, 2020, 13 pages, Rijswijk Netherlands.

*Primary Examiner* — Steven M Marsh
(74) *Attorney, Agent, or Firm* — Marshall & Melhorn, LLC

(57) ABSTRACT

A longitudinal adjustment mechanism for a vehicle seat may have a first rail and a second rail. The rails may engage about one another to form an inner channel. A spindle nut may be connected to the second rail and a spindle operationally connected to the spindle nut may be arranged in the inner channel. On one end of the first rail, a transmission may be driven by a motor, which may interact with the spindle. The spindle may be screwed into an internal thread of a worm gear of the transmission, and the spindle may be conjointly connected by a fixing element to the worm gear. The fixing element may be arranged coaxially to a spindle axle of the spindle and may be pressed between a front end portion of
(Continued)

the spindle and the worm gear. A vehicle seat having the longitudinal adjustment mechanism is also provided.

19 Claims, 3 Drawing Sheets

(56) References Cited

U.S. PATENT DOCUMENTS

| | | | | |
|---|---|---|---|---|
| 6,220,642 | B1* | 4/2001 | Ito | B60N 2/067 |
| | | | | 296/65.14 |
| 7,661,647 | B2* | 2/2010 | Ito | B60N 2/0705 |
| | | | | 248/429 |
| 9,145,068 | B2* | 9/2015 | Bosecker | B60N 2/4214 |
| 10,933,771 | B2* | 3/2021 | Geiges | F16H 57/0025 |
| 2019/0143847 | A1* | 5/2019 | Taniguchi | B60N 2/0722 |
| | | | | 248/429 |

FOREIGN PATENT DOCUMENTS

| | | |
|---|---|---|
| DE | 102009003280 A1 | 11/2010 |
| DE | 102011004143 A1 | 8/2012 |
| DE | 102017218492 A1 | 2/2019 |
| EP | 3492312 A1 | 6/2019 |
| JP | 2007126103 A | 5/2007 |
| WO | 2016150790 A1 | 9/2016 |

* cited by examiner

LONGITUDINAL ADJUSTMENT MECHANISM, VEHICLE SEAT

FIELD

The invention relates to a longitudinal adjustment mechanism, in particular for a vehicle seat, the longitudinal adjustment mechanism having at least one pair of rails formed from a first rail and a second rail which is displaceable in the longitudinal direction relative to the first rail, wherein the rails alternately engage around each other forming an inner channel, wherein a spindle nut connected to the second rail and a spindle operatively connected to the spindle nut are arranged in the inner channel, wherein a gear which is drivable by means of a motor and interacts with the spindle is arranged at one end of the first rail, wherein the spindle is screwed by means of an external thread of the spindle into an internal thread of a worm wheel of the gear, and the spindle is connected by means of a fixing element to the worm wheel for conjoint rotation. The invention also relates to a vehicle seat.

BACKGROUND

A drive device for a motor vehicle seat in a sliding device is known from DE 10 2005 023 095 A1. The drive device for use with a motor vehicle seat sliding device comprises mating fixed and movable rail parts that can be moved between a front position and a rear position. The drive device comprises an elongated spindle, a spindle nut, a gear and a mounting device. The spindle defines a spindle axis and has a spindle thread extending in the longitudinal direction. The spindle nut can be securely fastened to a first rail part and has an internal thread that can engage in the spindle thread. The gear can be mounted on a different rail part and selectively rotates the spindle around the spindle axis. The spindle of the drive device is provided with a spindle wheel which, in the mounted state of the drive device, extends outward through spindle wheel openings in the movable rail part.

A longitudinal adjustment mechanism, in particular for a vehicle seat, is known from DE 10 2017 218 492 A1. The longitudinal adjustment mechanism has at least one pair of rails formed from a first rail and a second rail which is displaceable in the longitudinal direction relative to the first rail, wherein the rails alternately engage around one another forming an inner channel. A spindle nut mounted with the second rail and a spindle operatively connected to the spindle nut are arranged in the inner channel, wherein a gear which is drivable by means of a motor and interacts with the spindle is arranged at one end of the first rail. The spindle is mounted at a front end section of the spindle in the gear and at a rear end section of the spindle in a rotary bearing of the first rail. In the longitudinal direction in front of the spindle nut, a first crossbar is received in a slot in the first rail, wherein the spindle is passed through an opening in the first crossbar without contact, in particular forming an encircling gap, wherein a shoulder of the spindle is arranged spaced apart forward in the longitudinal direction with respect to the first crossbar, wherein in response to a predetermined action of force, for example in the event of a crash, in particular by a displacement of the first rail, the first crossbar jams between the first rail and the shoulder and a force from the first rail is thereby conductable away via the first crossbar, the shoulder, the spindle and the spindle nut to the second rail.

A longitudinal adjustment mechanism for a vehicle seat is known from each of DE 10 2006 035 437 A1 and JP 2007-126103 A, said longitudinal adjustment mechanism providing a plug-in connection between a corrugated and thread-free section of a spindle and a correspondingly corrugated mating section of a worm wheel of a spindle gear for conjoint rotation.

A longitudinal adjustment mechanism for a vehicle seat is known from each of DE 10 2011 004 143 A1 and WO 2016/150790 A1. The longitudinal adjustment mechanism in each case has at least one pair of rails formed from a first rail and a second rail which is displaceable in the longitudinal direction relative to the first rail, wherein the rails alternately engage around one another forming an inner channel. A spindle which is connected in a fixed position and non-rotatably to the second rail, and a spindle gear which is operatively connected to the spindle are arranged in the inner channel. The vehicle seat is adjusted longitudinally by moving the spindle by means of the spindle gear.

A longitudinal adjustment unit for a seat in a motor vehicle is known from EP 3 492 312 A1, comprising a housing with a through opening which is arranged along a longitudinal axis and has a first spindle opening and a second spindle opening. Furthermore, the longitudinal adjustment unit has a spindle which can be passed through the through opening along the longitudinal axis through the housing. The longitudinal adjustment unit has a spindle nut and a worm which drives the spindle nut and is mounted in the housing by a bearing collar on both sides, wherein the spindle nut is mounted in the housing rotatably and axially on both sides in the longitudinal axis, wherein a spindle lock nut is provided by which the spindle is connected to the spindle nut for conjoint rotation.

SUMMARY

The invention is based on the problem of improving a longitudinal adjustment mechanism of the type mentioned at the beginning, in particular a longitudinal adjustment mechanism with an increased load-bearing capacity, and of providing a corresponding vehicle seat.

This problem is solved according to the invention by a longitudinal adjustment mechanism, in particular for a vehicle seat, the longitudinal adjustment mechanism having at least one pair of rails formed from a first rail and a second rail which is displaceable in the longitudinal direction relative to the first rail, wherein the rails alternately engage around each other forming an inner channel, wherein a spindle nut connected to the second rail and a spindle operatively connected to the spindle nut are arranged in the inner channel, wherein a gear which is drivable by means of a motor and interacts with the spindle is arranged at one end of the first rail, wherein the spindle is screwed, in particular at one end section, preferably at a front end section, by means of an external thread of the spindle into an internal thread of a worm wheel of the gear, and the spindle is connected by means of a fixing element to the worm wheel for conjoint rotation, wherein the fixing element is arranged coaxially with respect to a spindle axis of the spindle and is pressed between an end section, in particular the front end section, of the spindle and the worm wheel.

Since the fixing element is arranged coaxially with respect to a spindle axis of the spindle and is pressed between an end section, in particular a front end section, of the spindle and the worm wheel, the spindle is connected to the worm wheel for conjoint rotation.

The spindle is preferably screwed at one end section, preferably at a front end section, into an internal thread of a worm wheel of the gear by means of an external thread of the spindle. As a result, a connection to the worm wheel that is loadable in the direction of longitudinal extent of the spindle can be produced, thus permitting a corresponding transmission of force in the direction of longitudinal extent.

Since the spindle is connected by means of a fixing element to the worm wheel for conjoint rotation, a transmission of torque around the axis of longitudinal extent of the spindle from the worm wheel to the spindle is also made possible.

The first rail can preferably be a seat rail, in particular a top rail, which is connectable to a vehicle seat. The second rail can preferably be a floor rail, in particular a bottom rail, which is connectable to a vehicle structure.

In response to a predetermined action of force, for example in the event of a crash, a force from the first rail is conductable away via a gear holder, the gear, the spindle and the spindle nut to the second rail.

The longitudinal adjustment mechanism can have a gear holder. The gear holder can have two limbs parallel to one another. The two opposite limbs are preferably connected to one another in a manner known per se via a web. A fastening section, by means of which the gear holder is held on the first rail, can be connected to each of the limbs. The fastening sections can be bent by approximately 90° with respect to the respective adjacent limb. In the assembled state of the U-shaped gear holder, the gear can be accommodated between the limbs. In order to provide a connection between the gear holder and the first rail that is load-bearing in the event of a crash, projections protruding laterally in the transverse direction can be provided on the limbs of the gear holder, said projections interacting through corresponding cutouts in a lateral section of the second rail.

The spindle can have a thread-free section at its front end section. The front end section of the spindle can have a thread-free section and a threaded section. The spindle can have a thread-free portion at a rear end section. The rear end section of the spindle can have a thread-free section and a threaded section.

The fixing element can provide a form-fitting connection between the spindle and the worm wheel. The fixing element can provide a force-fitting connection between the spindle and the worm wheel. The fixing element can be a bushing, in particular a hollow-cylindrical bushing. The fixing element can be a plastically deformed bushing. The fixing element can be a bushing which is plastically deformed in an axial direction. The fixing element can be a bushing which is plastically deformed in a radial direction. The fixing element can be a bushing which is plastically deformed in an axial direction and in a radial direction. The fixing element can be a compression sleeve. The fixing element can be connected to the spindle and the worm wheel by a material bond. The fixing element can be adhesively bonded to the spindle and the worm wheel. The fixing element can be welded to the spindle and the worm wheel.

A rear end section of the spindle can be mounted in a rotary bearing in the first rail. A rear end section of the spindle can be mounted in the first rail by means of the thread-free section in the rotary bearing. In the region of the rotary bearing at the rear end section of the spindle, additional means for force dissipation can be provided, in particular in the event of a rear impact. Such means are described, for example, in DE 10 2017 218 492 A1, the disclosure content of which relating thereto is hereby expressly included.

The external thread of the spindle can be configured in the form of a trapezoidal thread. The internal thread of the worm wheel can be configured in the form of a trapezoidal thread. The external thread of the spindle and the internal thread of the worm wheel can each be configured with two starts.

The problem is furthermore solved according to the invention by a vehicle seat with a longitudinal adjustment mechanism according to the invention, in particular a longitudinal adjustment mechanism according to the description above.

DESCRIPTION OF THE FIGURES

Before refinements of the invention are described in more detail below with reference to figures, it should first be noted that the invention is not limited to the components described. Furthermore, the terminology used does not constitute a restriction, but is merely of an exemplary nature. Insofar as the singular is used in the description and the claims below, the plural is also included, unless the context explicitly excludes this.

The invention is explained in more detail in the following text on the basis of an advantageous exemplary embodiment illustrated in the figures. The invention is not limited to this exemplary embodiment, however. In the figures.

DETAILED DESCRIPTION

Figure 1:
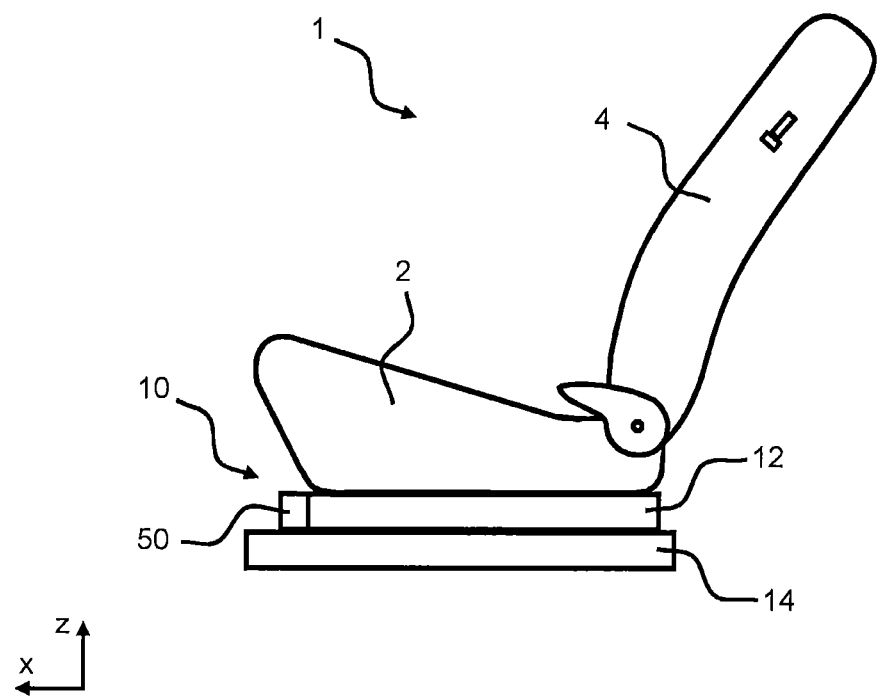
FIG. 1: shows a vehicle seat according to the invention.

A vehicle seat 1 illustrated schematically in FIG. 1 is described below using three spatial directions running perpendicular to one another. In the case of a vehicle seat 1 installed in the vehicle, a longitudinal direction x runs substantially horizontally and preferably parallel to a vehicle longitudinal direction, which corresponds to the normal direction of travel of the vehicle. A transverse direction, which runs perpendicularly with respect to the longitudinal direction x, is likewise oriented horizontally in the vehicle, and runs parallel to a vehicle transverse direction. A vertical direction z runs perpendicularly to the longitudinal direction x and perpendicularly to the transverse direction. In the case of a vehicle seat 1 installed in the vehicle, the vertical direction z runs parallel to the vertical axis of the vehicle.

The positional and directional indications used, such as for example front, rear, top and bottom, relate to a viewing direction of an occupant sitting in the vehicle seat 1 in a normal sitting position, wherein the vehicle seat 1 is installed in the vehicle, in a use position suitable for passenger transport, with an upright backrest 4, and is oriented in the conventional manner in the direction of travel. The vehicle seat 1 may however also be installed in a different orientation, for example transversely with respect to the direction of travel.

The vehicle seat 1 shown in FIG. 1 has a seat part 2 and the backrest 4 which is adjustable in its inclination relative to the seat part 2. An inclination of the backrest 4 can be adjustable, for example, by means of a latching fitting or a geared fitting. The vehicle seat 1 is mounted on a longitudinal adjustment mechanism 10 for adjusting a longitudinal seat position.

Figure 2:
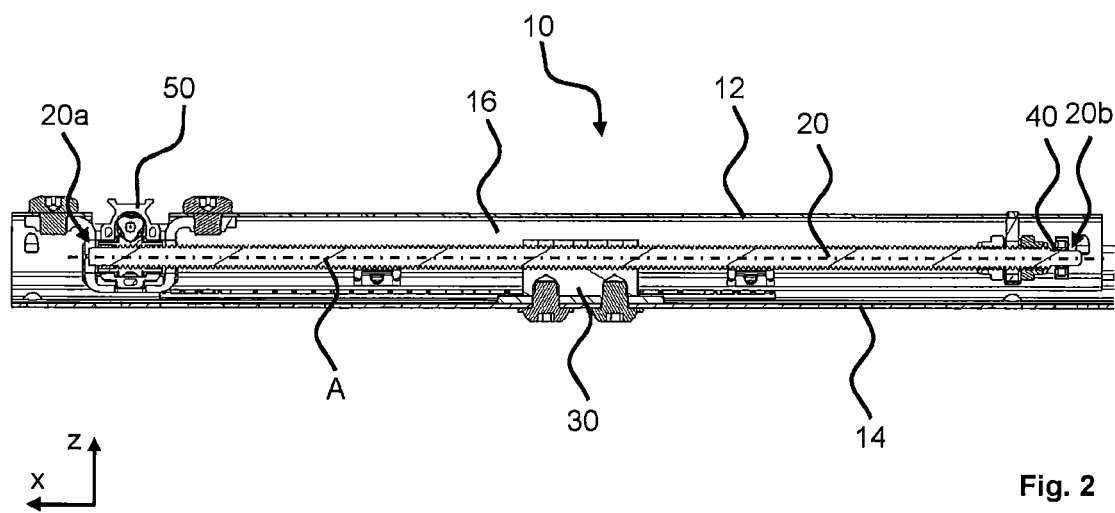
FIG. 2: shows a longitudinal section of a longitudinal adjustment mechanism according to the invention of the vehicle seat from FIG. 1, FIG. 3: shows a detail of an enlarged illustration of FIG. 2, FIG. 4: shows a gear holder with gear, a spindle and a fixing element in a first assembly state.

FIG. 2 shows the longitudinal adjustment mechanism 10 according to the invention of the vehicle seat 1 from FIG. 1. The longitudinal adjustment mechanism 10 has at least one pair of rails, preferably two pairs of rails. The pairs of rails are each formed from a first rail 12, in particular for connection to a seat structure, and from a second rail 14, in particular for connection to a vehicle structure. The rails 12, 14 of the pair of rails are displaceable in the longitudinal direction x relative to one another and engage alternately around one another forming an inner channel 16. A spindle nut 30 connected to the second rail 14 and a spindle 20 operatively connected to the spindle nut 30 are arranged in the inner channel 16. In the present case, the spindle nut 30 is held fixed, in particular screwed, to the second rail 14. The spindle 20 extends along a spindle axis A parallel to the longitudinal direction x.

At a front end section 20a of the spindle 20 there is arranged a gear 50 which is drivable by means of a motor (not illustrated) and which interacts with the spindle 20. The motor can be held on a motor carrier mounted between the two gears 50 of the respective pairs of rails and can drive the two gears 50 by means of a shaft, not illustrated in FIG. 2. The motor here drives in particular a worm 52 that is rotatably mounted about a worm axis of rotation and by means of which a worm wheel 54 that is rotatably mounted perpendicular to the worm axis of rotation is drivable in a predetermined reduction ratio. The worm 52 and the worm wheel 54 are preferably accommodated in a common gear housing. The worm wheel 54 has a central section 54a having an internal thread 56 and two bearing sections 54b adjoining the central section 54a parallel to the longitudinal direction x. At least the front bearing section 54b in the longitudinal direction x is configured to be thread-free.

The worm wheel 54 is provided in order to drive the spindle 20 in rotation about a spindle axis A. The gear 50 supports the front end section 20a of the spindle 20. A rear end section 20b of the spindle 20 is mounted in a rotary bearing 40 on the first rail 12.

Figure 3:
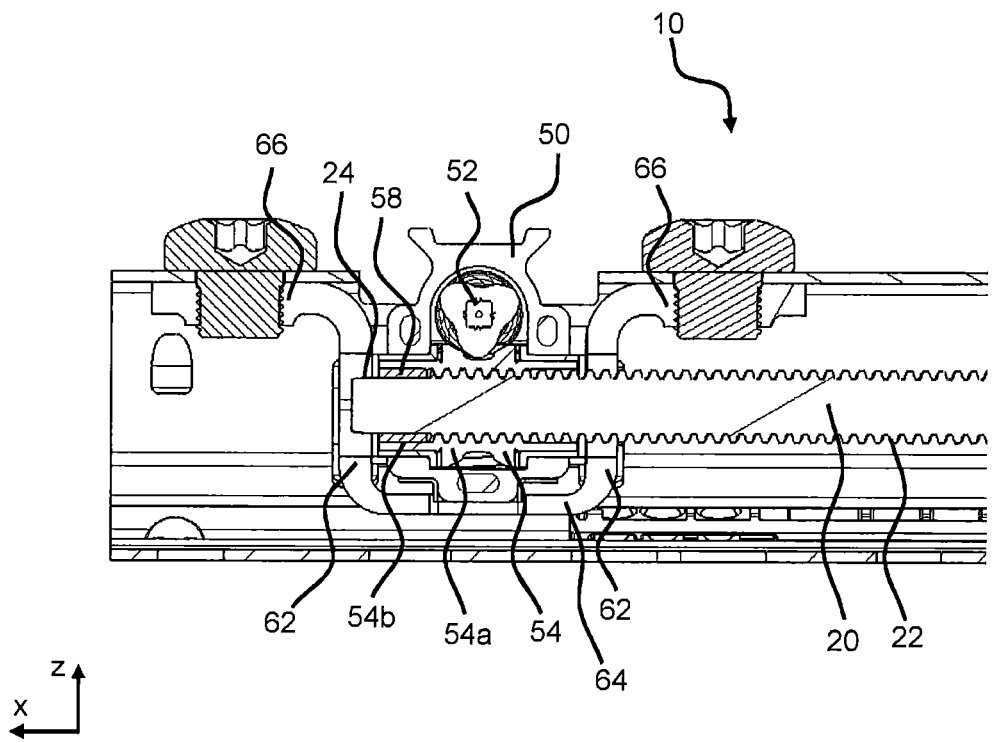

FIG. 3 shows an illustration, enlarged in detail, of the longitudinal adjustment mechanism 10 in the region of the front end section of the spindle 20. The gear 50 is connected to the first rail 12 by means of a gear holder 60. The gear holder 60 has two limbs 62 parallel to one another. The two opposite limbs 62 are connected to one another in a manner known per se via a web 64. Each of the limbs 62 is adjoined by a fastening section 66, by means of which the gear holder 60 is held on the first rail 12. The fastening sections 66 are bent by approximately 90° with respect to their respective limbs 62. In the assembled state of the U-shaped gear holder 60, the gear 50 is received between the limbs 62.

In known devices for longitudinal seat adjustment, the fastening sections 66 usually have threaded bores which, in interaction with corresponding screws and/or threaded bolts, bring about a connection to the first rail 12. The gear holder 60 can alternatively be welded or riveted to the first rail 12.

The spindle 20 is passed through one of the two mutually parallel limbs 62 of the substantially U-shaped gear holder 60. In the present case, the spindle 20 is passed through the rear limb 62 parallel to the longitudinal direction x. At its front end section 20a, the spindle 20 is screwed into the internal thread 56 of a worm wheel 54 by means of the external thread 22 of the spindle 20. The spindle 20 is connected by means of a fixing element 58 to the worm wheel 54 for conjoint rotation.

Figure 4:
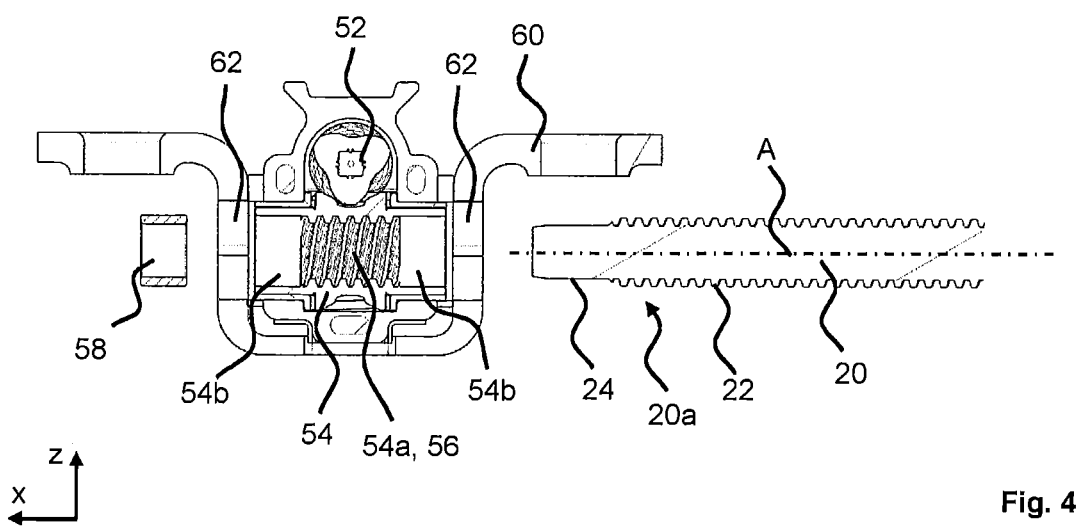

FIG. 4 shows the front end section 20a of the spindle 20, the fixing element 58 and an assembly, formed from the gear holder 60 and the gear 50, in a first assembly state in which the spindle 20 and the fixing element 58 are not connected to the assembly. The spindle 20 has a thread-free section 24 at its front end section 20a.

Figure 5:
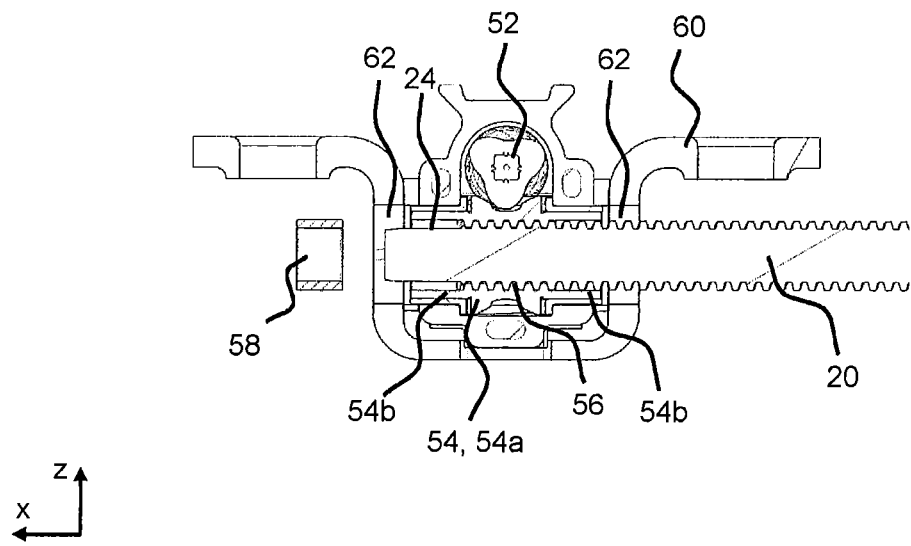
FIG. 5: shows the gear holder with gear, the spindle and the fixing element in a second assembly state.

FIG. 5 shows a subsequent assembly state in which the spindle 20 is passed through the rear limb 62 of the gear holder 60 parallel to the longitudinal direction x and is screwed into the internal thread 56 of the worm wheel 54 by means of the external thread 22 of the spindle 20. The spindle 20 is screwed in through the internal thread 56 of the worm wheel 54 in such a way that the thread-free section 24 of the spindle 20 protrudes through the internal thread 56 into the bearing section 54b, in the present case protruding through the latter.

Figure 6:
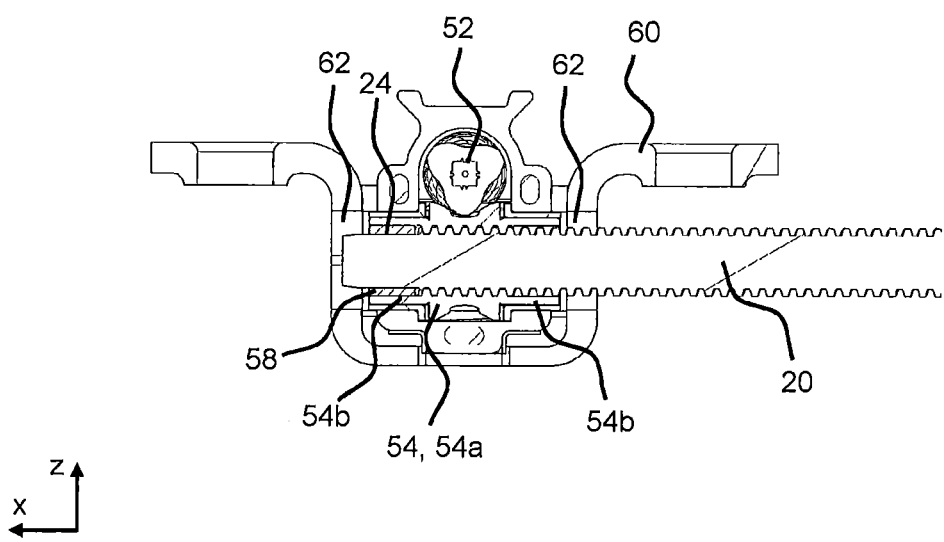
FIG. 6: shows the gear holder with gear, the spindle and the fixing element in a third assembly state.

FIG. 6 shows a third, in particular final, assembly state in which the spindle 20, which was previously screwed into the worm wheel 54, and the worm wheel 54 are connected to one another by means of the fixing element 58 for conjoint rotation. For this purpose, the fixing element 58 is inserted, in the present case pressed, from the front end section 20a of the spindle 20 into a previously empty region between the thread-free section 24 of the spindle 20 and the bearing section 54b of the worm wheel 50 surrounding the thread-free section 24. By pressing in the fixing element 58, the spindle 20 and the worm wheel 54 are frictionally connected to one another.

The features which are disclosed in the description above, in the claims, and in the figures may be of importance, both individually and in combination, for the implementation of the invention in its various configurations.

Although the invention has been described in detail in the figures and in the above illustration, the illustrations should be understood as being illustrative and by way of example and not as restrictive. In particular, the selection of the graphically illustrated proportions of the individual elements should not be interpreted as being required or limiting. Furthermore, the invention is in particular not limited to the exemplary embodiments discussed. Further variants of the invention and the implementation thereof are apparent to a person skilled in the art from the preceding disclosure, from the figures and from the claims.

Terms such as "comprise", "have", "include", "contain" and the like used in the claims do not rule out further elements or steps. The use of the indefinite article does not rule out a plurality. A single device may perform the functions of several of the units or devices mentioned in the claims.

LIST OF REFERENCE SIGNS

1 Vehicle seat
2 Seat part
4 Backrest
10 Longitudinal adjustment mechanism
12 First rail
14 Second rail
16 Inner channel
20 Spindle
20a Front end section (of the spindle 20)
20b Rear end section (of the spindle 20)
22 External thread
24 Thread-free section
30 Spindle nut 40 Rotary bearing
50 Gear
52 Worm
54 Worm wheel
54a Central section
54b Bearing section
56 Internal thread
58 Fixing element
60 Gear holder
62 Limb
64 Web
66 Connecting portion
A Spindle axis (of the spindle 20)
x Longitudinal direction
z Vertical direction

The invention claimed is:

1. A longitudinal adjustment mechanism for a vehicle seat, comprising:
    at least one pair of rails formed from a first rail and a second rail which is displaceable in the longitudinal direction relative to the first rail,
    wherein the rails alternately engage around each other forming an inner channel,
    wherein a spindle nut connected to the second rail and a spindle operatively connected to the spindle nut are arranged in the inner channel,
    wherein a gear which is drivable by a motor and interacts with the spindle is arranged at one end of the first rail,
    wherein the spindle is screwed by an external thread of the spindle into an internal thread of a worm wheel of the gear, and the spindle is connected by a fixing element to the worm wheel for conjoint rotation,
    wherein the fixing element is arranged coaxially with respect to a spindle axis of the spindle and is pressed between a front-end section of the spindle and the worm wheel,
    wherein the spindle has a thread-free section at the front-end section and a thread-free section at a rear-end section,
    wherein the thread-free section at the front end section of the spindle extends longitudinally past the gear along the spindle axis.

2. The longitudinal adjustment mechanism as claimed in claim 1, wherein the spindle is supported at the front-end section by the worm wheel of the gear.

3. The longitudinal adjustment mechanism as claimed in claim 1, wherein in response to a predetermined action of force, comprising a crash, a force from the first rail is conductible away via the gear, the spindle and the spindle nut to the second rail.

4. The longitudinal adjustment mechanism as claimed in claim 1, wherein the fixing element provides a form-fitting connection between the spindle and the worm wheel.

5. The longitudinal adjustment mechanism as claimed in claim 1, wherein the fixing element provides a force-fitting connection between the spindle and the worm wheel.

6. The longitudinal adjustment mechanism as claimed in claim 1, wherein the fixing element is a compression bushing.

7. The longitudinal adjustment mechanism as claimed in claim 1, wherein a rear end section of the spindle is mounted in a rotary bearing in the first rail.

8. The longitudinal adjustment mechanism as claimed in claim 7, wherein the rear end section of the spindle is mounted in the rotary bearing by the thread-free section.

9. The longitudinal adjustment mechanism as claimed in claim 1, wherein the external thread of the spindle and the internal thread of the worm wheel are configured in the form of a trapezoidal thread.

10. The longitudinal adjustment mechanism as claimed in claim 1, wherein the external thread of the spindle and the internal thread of the worm wheel are configured with two starts.

11. A longitudinal adjustment mechanism for a vehicle seat, comprising:
    at least one pair of rails formed from a first rail and a second rail which is displaceable in the longitudinal direction relative to the first rail,
    wherein the rails alternately engage around each other forming an inner channel,
    wherein a spindle nut connected to the second rail and a spindle operatively connected to the spindle nut are arranged in the inner channel,
    wherein a gear which is drivable by a motor and interacts with the spindle is arranged at one end of the first rail,
    wherein the spindle is screwed by an external thread of the spindle into an internal thread of a worm wheel of the gear, and the spindle is connected by a fixing element to the worm wheel for conjoint rotation,
    wherein the fixing element is arranged coaxially with respect to a spindle axis of the spindle and is pressed between a front-end section of the spindle and the worm wheel,
    wherein the fixing element is a compression bushing,
    wherein the spindle has a thread-free section at the front-end section and a thread-free section at a rear-end section,
    wherein outer diameters of the thread-free sections are substantially the same as an outer diameter of the spindle along the length of the spindle.

12. The longitudinal adjustment mechanism as claimed in claim 11, wherein a rear end section of the spindle is mounted in a rotary bearing in the first rail.

13. The longitudinal adjustment mechanism as claimed in claim 11, wherein the rear end section of the spindle is mounted in a rotary bearing by the thread-free section.

14. The longitudinal adjustment mechanism as claimed in claim 11, wherein the external thread of the spindle and an internal thread of the worm wheel are configured in the form of a trapezoidal thread.

15. The longitudinal adjustment mechanism as claimed in claim 1,
    wherein the spindle is of one, unitary and integrally formed piece having the thread free sections on the front-end section and the rear-end section.

16. The longitudinal adjustment mechanism as claimed in claim 1,
    wherein a portion of the thread free section at the front-end of the spindle is cantilevered from the fixing element along the spindle axis.

17. The longitudinal adjustment mechanism as claimed in claim 1,
    wherein a portion of the thread free section on the front-end section extends longitudinally past the fixing element along the spindle axis.

18. The longitudinal adjustment mechanism as claimed in claim 8,
    wherein a portion of the thread-free section at the rear-end section of the spindle extends past the rotary bearing.

19. The longitudinal adjustment mechanism as claimed in claim 8,
   wherein a portion of the thread-free section at the rear-end section of the spindle is cantilevered from the rotary bearing.

\* \* \* \* \*